May 17, 1932.  A. ZOLLER  1,859,264
ENGINE PROVIDED WITH A ROTARY COMPRESSOR
Filed June 19, 1925   3 Sheets-Sheet 1

INVENTOR
Arnold Zoller
BY
ATTORNEYS

INVENTOR
Arnold Zoller
BY
ATTORNEYS

May 17, 1932. A. ZOLLER 1,859,264
ENGINE PROVIDED WITH A ROTARY COMPRESSOR
Filed June 19, 1925   3 Sheets-Sheet 3

INVENTOR
ARNOLD ZOLLER,
BY
ATTORNEY

Patented May 17, 1932

1,859,264

UNITED STATES PATENT OFFICE

ARNOLD ZOLLER, OF SURESNES, FRANCE

ENGINE PROVIDED WITH A ROTARY COMPRESSOR

Application filed June 19, 1925, Serial No. 38,323, and in France June 21, 1924.

Explosion engines provided with a fan serving to ensure the feeding of the cylinders are known.

These engines present the disadvantage that, when running, at slow speed, the suction created by a reciprocating piston in the cylinder of a four cycle engine is greater in proportion to the output of the fan, so that the suction in the cylinder must draw the air or mixture through the fan. It results therefrom that the power of an engine provided with a fan is lower, when running at slow speed, than that of an engine without fan. Besides, the output of the fan is decreased when the normal speed is exceeded so that the power of the engine is diminished. Thus, these engines so equipped cannot be used for high speeds.

Engines also exit which are provided with rotary compressors for charging the cylinders. The outflow and pressure of these compressors are approximately constant at all speeds. The losses through the interstices increase however, in general, with the increase of the speed and pressure so that the outflow generally diminishes.

The present invention has for its object the provision of a rotary compressor which has a greater capacity than is required for supplying the combustion chamber of an engine with either a combustible fluid or air, the effective pressure curve of the compressor at all speeds being greater than the curve of the resistance in the supply conduit to the engine. The output of the compressor in spite of the losses is approximately uniform at all speeds while the outflow may increase with increasing speed but never diminishes.

By this means an absolutely constant or increasing charging of the engine cylinder is obtained, notwithstanding the increase of the resistance in the feeding conduit pipe with the increase of the speed, so that the engine presents an absolutely straight power curve of 45°, or even greater, that is to say having an inclination superior to 45°, up to the maximum speed for which the compressor is devised.

Owing to this constancy of feeding at all speeds, notwithstanding the increase of the resisting pressure, a constant average pressure on the piston is obtained at all speeds, or even a pressure increasing with the increase of speed and consequently a constant torque.

The accompanying drawings will enable to more clearly understand, by means of diagrams, the preceding principles.

Figure 1:
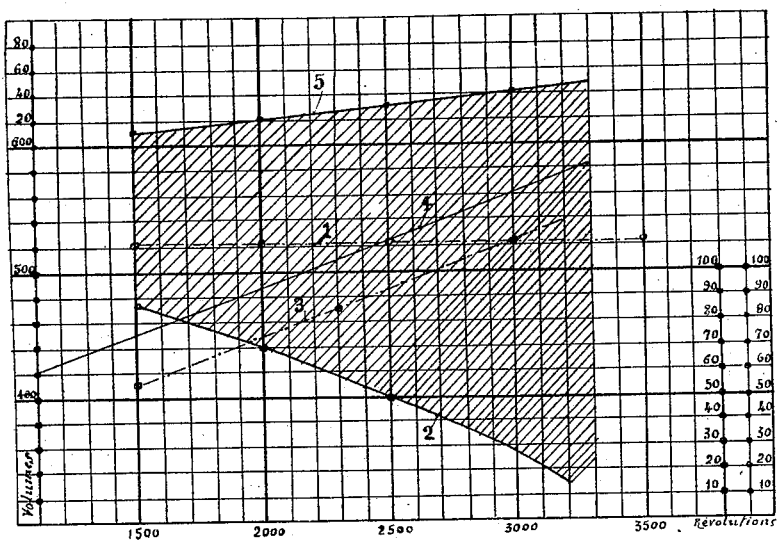
Figure 2:
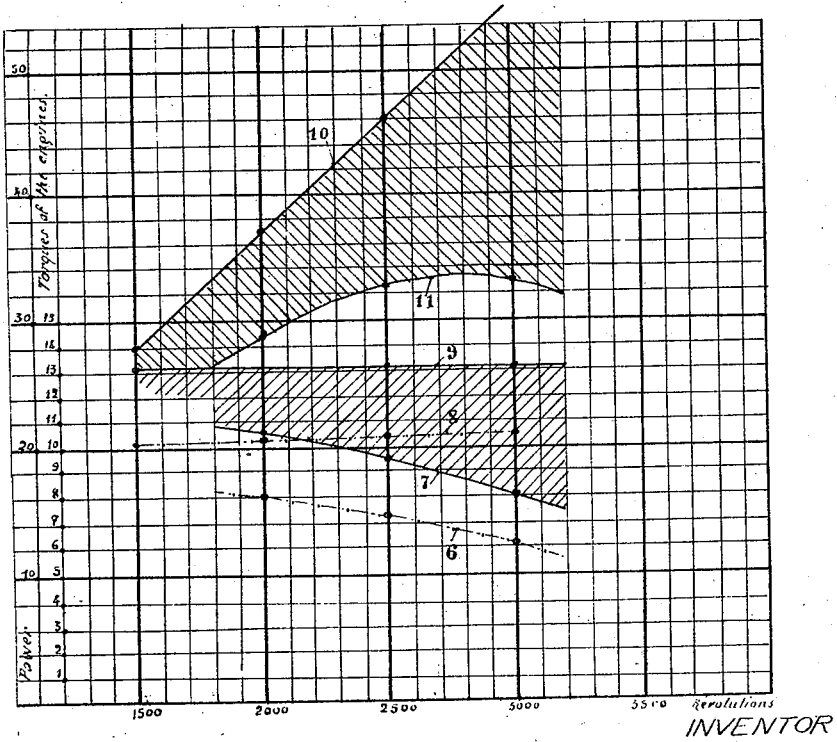
Figure 3:
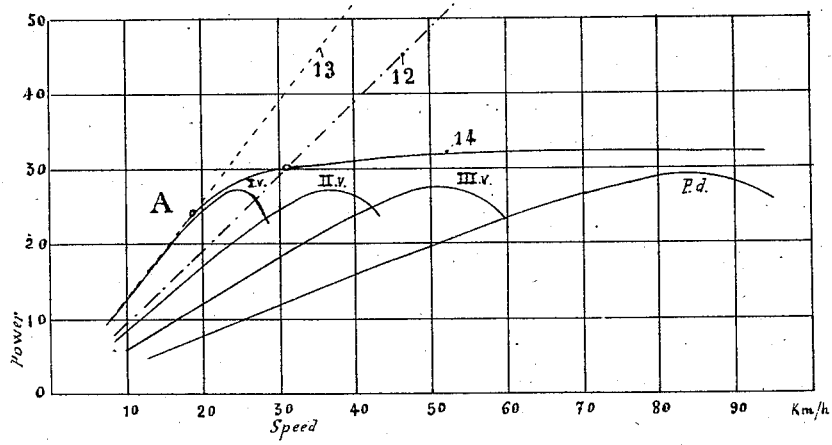
Figure 4:
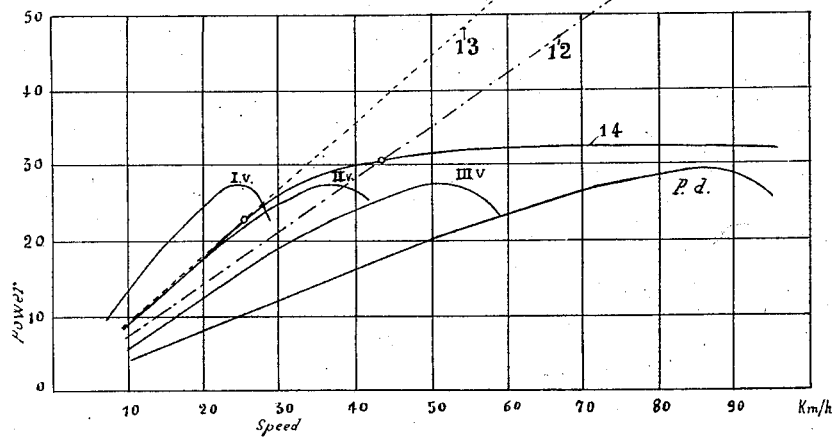
Figure 5:
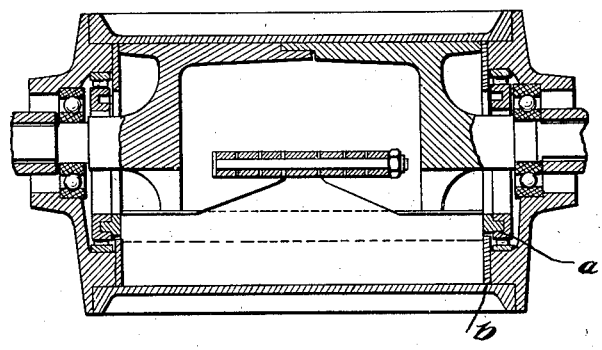
Figure 6:
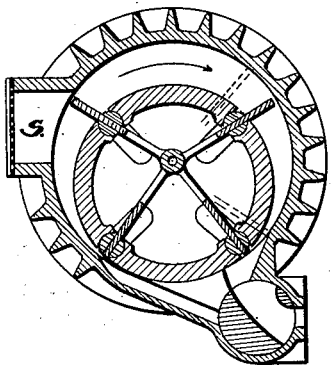
Figure 7:
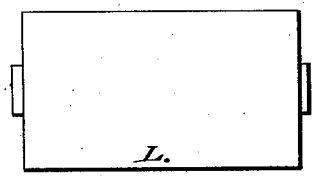
Figure 8:
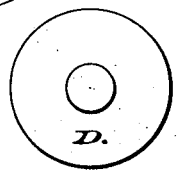
Figure 9:
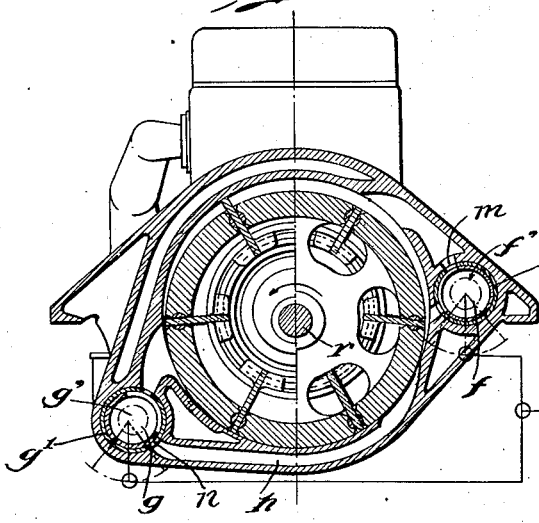
Figure 10:
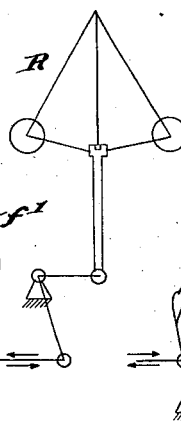

Figure 1 shows a diagram indicating the effective delivery of the compressor and the resistance to the feeding, Figure 2 is a diagram disclosing the relations between the torque and engine pressure of my device with respect to the ordinary engine, Figure 3 is a diagram disclosing the curve of resistance to running in accordance with the various speeds and the power curve of the engine with normal feeding, Figure 4 is a diagram similar to the diagram in Fig. 3, establishing the particular case in which two speeds are mechanically controlled, while the other two speeds are maintained by the proper manipulation of the engine in accordance with the principles of my invention, Figure 5 is a longitudinal vertical section of a compressor constructed according to the principles of my invention, Figure 6 is a tranverse vertical section of the compressor shown in Fig. 5, Figure 7 is a longitudinal side view of the rotor of the compressor, Figure 8 is an end view of the same, Figure 9 is a view in elevation of an engine showing the compressor connected therewith in transverse vertical section, Figure 10 is a diametrical side view of a pedal for operating the valves.

In Fig. 1 the number of revolutions per minute are indicated in abscissæ and the volumes in cubic centimeters per minute in ordinates. Line 2 represents the combustible mixture charging curve of an engine cylinder without compressor, line 1 respresenting the volume displacement in cubic centimeters per minute of a cylinder. It will be seen from line 2 that the charging diminishes when the speed increases. Line 3 represents the charging pressure curve of the cylinder, or in other words the curve of the resistance in the feeding conduit pipe.

This resistance obviously increases with the speed. Line 4 represents the delivery pressure curve which is always chosen superior to pressure curve line 3. Consequently the charging of the cylinder is always ensured under suitable conditions. Finally, line 5 represents the curve of effective delivery or of outflow of the compressor which measures also the charging of the cylinder.

Under these conditions, a constant or increasing feeding of the engine is obtained. In this way, whilst an ordinary engine presents a curve 6 of average pressure on the piston and a curve 7 of the values of the torque which are decreasing, Fig. 2, the new engine presents an average pressure curve 8 and a torque curve 9, which are straight and horizontal. The power curve 10 is straight and inclined at 45° or even more. By comparing it with the power curve 11 of an ordinary engine, it will be seen that a very important gain in power in obtained, this gain in power being as much greater as the speed is greater.

The conditions which have just been indicated can be realized in various ways. However, use is preferably made of the following means:

In the compressor the vanes are given a rather large play in the guides which are near the center at $a$ shown in Figs. 5 and 6 whilst they are more exactly adjusted at their portion farthest away from the center at $b$. In fact, the play or space between the peripheral edge of the vanes and the fixed body diminishes with the increase of centrifugal force due to the increase of speed, thus compensating for the increase of the losses which would tend to take place through these spaces owing to the increase of the pressure.

The admission cross sections S, Fig. 6, of the compressor are given greater values than usual so as to diminish the power consumed by the compressor.

Finally, the compressor is given a rather great length L and a small diameter D, Fig. 8, and the eccentricity is reduced so as to diminish the speeds of radial displacement of the vanes.

The above system is more particularly adapted for high speed and high power engines, as for instance for racing car engines, aviation engines, etc.

In order to be able to utilize with advantage the same principles in a motor car and to permit at the same time of doing away with the change speed gearing, or of reducing the number of speeds, without the power reaching an undesirable value when the speed increases, the feeding is reduced from a given point A of the diagram in proportion as the speed increases either by means of a governor R, Fig. 9, or by means of a pedal P. This result is obtained by controlling the compressor on the suction side or on the delivery side, or on both sides, so that the outflow of the compressor is diminished when the speed increases. There is thus obtained, starting from a speed to be determined at will, a flattened power curve, the maximum height of which is above the resistances opposed by the road, such for instance as that due to the ascent of a hill.

Referring more particularly to Fig. 1, it will be noted that at the bottom of the diagram a number of revolutions which progressively increase indicate the number of revolutions per minute. The numerals at the left in this figure will be volumes and the unit of each volume represents approximately 522 centimeters and is represented by the line 1 in said figure. In other words, the volume is the capacity of the combustion chamber or the amount of air which enters the combustion chamber in the cylinder by cycles. Thus, in two-cycle engines a predetermined number of unit volumes of air enters the cylinder during one revolution while in the case of four-cycle engines the volumes represent the amount of air entering the cylinder of the engine during two revolutions.

The pressures are represented by the column of figures at the right in Fig. 1. Thus, it will be seen that the same horizontal lines which aid in designating the amount of volumes when the figures on the left are considered will also aid in designating the pressures when the figures on the right are considered. Such pressures are calculated in centimeters in mercury.

The diagram of Fig. 3 in which the speeds per hour are indicated in abscissæ and the effective powers measured at the rear wheels are indicated in ordinates, shows in I$v$, II$v$, III$v$, and $p\,d$ the curves of the resistances to running according to the different speeds, first, second, third speed and direct drive. The power curve of the engine with normal feeding would be at 12 and would not cover all the speeds. The curve with superfeeding, in the conditions indicated above, is shown at 13 and covers all the speeds, so that the change speed gearing becomes unnecessary and can be done away with.

But very rapidly the power rises in an excessive and even dangerous manner, as shown by line 13. For an ordinary car, it is convenient to have a flattened power curve 14 extending rather closely over the curves at the different speeds. This is what is obtained by reducing the suction from a certain speed corresponding to point A.

The diagram of Fig. 4 is similar to the preceding one, but establishes in a particular case that it is preferable not to try to cover the curve I$v$ and to keep a change speed gearing of at least two speeds, that is to say the first speed and direct drive.

If this adjustment of the suction depended on the pilot, he might allow excessive powers to develop, which might deteriorate the engine or the car, especially when the driver is inexperienced. In order to avoid this inconvenience, the new engine provided with a compressor is so combined that the effect of reduction of the suction is effected automatically; for that purpose, the suction and delivery channels of the compressor are divided for a predetermined reduced speed as shown in dotted lines in Fig. 9; when this speed is exceeded, the outflow of the compressor automatically diminishes. The power curve then automatically adapts itself to the curves of the resistance to running of the car.

The invention can be carried out in two manners:

(1) By the application on the suction pipe $f$ in a sleeve $f'$, or on the exhaust pipe $g$ mounted in a sleeve $g'$ of the compressor, or on both, of a damper valve $f'$ and $g'$ respectively, controlled by a governor R, which may be of the centrifugal type driven by the engine.

(2) By the reduction of the cross section of the suction or exhaust orifices, or of both, of the compressor, individually for each mode of application for instance.

Referring more particularly to Fig. 9, the centrifugal governor R is adapted, during an increase in the speed of the engine, to rotate the damper valves $f'$ and $g'$ in a counterclockwise direction in order to control the operation of the compressor as set forth above. The various positions of the valves are illustrated in dotted lines, the most extreme left position being the initial position wherein it will be apparent that valve $g'$ establishes communication through port $n$ and bypass $h$ with the suction side of the compressor. This communication is gradually cut off as valve $g'$ rotates counterclockwise in accordance with the increase in speed of the engine, thereby increasing the supercharging effect. As soon, however, as the point A is reached on the curve 14, the supercharging is decreased by reason of the closing of the inner port $m$ of the valve $f'$ during further rotation of said valve in a counterclockwise direction upon a further increase in the speed of the engine, the resultant supercharging effect being represented by the flattened portion of the curve 14.

The above arrangements are given by way of example only; the forms, dimensions, materials used and all detail arrangements can be varied without departing thereby from the principle of the invention.

Claims:—

1. In an internal combustion engine, a rotary compressor adapted to produce a superfeeding up to a determined point in the operation of the engine after which the feeding is reduced beyond this point, said compressor having an exhaust pipe and an intake pipe, a valve for controlling the exhaust of the compressor, a valve for controlling the intake of the compressor, and a governor actuated by the engine for controlling closing or opening of the valves, said exhaust valve being gradually opened until a predetermined speed of the engine has been obtained when the governor will act to cause the gradual closing of the intake valve and a reduction in the feeding therethrough.

2. In combination with an internal combustion engine having a supercharger adapted to supply a fluid under pressure thereto, an inlet opening for said supercharger, an outlet opening for the supercharger communicating with the engine, means for maintaining said inlet and outlet openings respectively in operative position to effect an increase in supercharging pressure of the fluid supplied to the engine up to a predetermined speed, and means for maintaining the supercharging pressure substantially constant during increasing engine speeds above said predetermined speed.

3. In combination with an internal combustion engine, means for supplying a fluid to said engine, said means including a rotary compressor for increasing the pressure of said fluid in proportion to increases in the speed of the engine up to a predetermined speed to provide an increasing supercharging thereof, and means including valve mechanism for decreasing the supercharging effect at speeds in excess of said predetermined speed to maintain a substantially constant pressure on said fluid, said means also including a governing mechanism operable by said engine and cooperating with said valve mechanism.

4. In combination with an internal combustion engine, means for supplying a fluid thereto, said means comprising a rotary compressor for increasing the pressure of said fluid in accordance with increases in engine speed up to a predetermined speed to provide a supercharging of the engine, a controlled inlet and outlet respectively for said compressor, and means for reducing the supercharging effect at speeds in excess of said predetermined speed in order to maintain the pressure of said fluid substantially constant, said means including a centrifugally-operated mechanism responsive to the speed of said engine and cooperating with and controlling both said inlet and said outlet of the compressor.

The foregoing specification of my "improvement in engines provided with a rotary compressor" signed by me this 9th day of June, 1925.

ARNOLD ZOLLER.